United States Patent
Bach

(10) Patent No.: US 6,725,805 B1
(45) Date of Patent: Apr. 27, 2004

(54) PET SHELTER/INCUBATOR

(76) Inventor: Debra Bach, 2415 N. Broad St., Colmar, PA (US) 18915

(*) Notice: Subject to any disclaimer, the term of this patent is extended or adjusted under 35 U.S.C. 154(b) by 0 days.

(21) Appl. No.: 10/602,482

(22) Filed: Jun. 23, 2003

Related U.S. Application Data
(60) Provisional application No. 60/390,314, filed on Jun. 21, 2002.

(51) Int. Cl.$^7$ ................................................ A01K 41/00
(52) U.S. Cl. ........................ 119/311; 119/314; 119/318; 119/421; 119/416
(58) Field of Search ................................ 119/300, 305, 119/306, 301, 314, 318, 320, 416, 417, 419, 421

(56) References Cited

U.S. PATENT DOCUMENTS

| | | | | |
|---|---|---|---|---|
| 4,478,175 A | * | 10/1984 | Fisher et al. ................. | 119/448 |
| 4,517,921 A | * | 5/1985 | Haythornthwaite ........... | 119/448 |
| 5,081,955 A | * | 1/1992 | Yoneda et al. ............... | 119/417 |
| 5,193,483 A | * | 3/1993 | Crider et al. ................. | 119/448 |
| 5,492,082 A | * | 2/1996 | Krevinghaus et al. ........ | 119/448 |
| 5,746,271 A | * | 5/1998 | DeCosta ...................... | 119/448 |
| 5,924,924 A | * | 7/1999 | Richardson .................. | 119/448 |
| 6,047,662 A | * | 4/2000 | Fekete .......................... | 119/416 |
| 6,403,922 B1 | * | 6/2002 | Hawks et al. ................. | 219/385 |
| 6,637,374 B2 | * | 10/2003 | Hawks et al. ................. | 119/448 |

* cited by examiner

Primary Examiner—Charles T. Jordan
Assistant Examiner—Judith A. Nelson
(74) Attorney, Agent, or Firm—Akin Gump Strauss Hauer & Feld, L.L.P.

(57) ABSTRACT

A pet shelter/incubator includes a hollow housing having an interior sufficiently large to comfortably receive at least one dog, a floor, a roof and at least one side wall extending between the floor and the roof and only partially surrounding the interior. It also includes at least one heat generator positioned within the housing to radiate into the interior and a sensor that is responsive to the presence and absence of an animal in the interior of the housing turn the heat generator on in the presence of the animal and off in its absence. The roof is removably mounted to the side wall and floor to convert the shelter into an incubator for newborn and young animals with a rigid closure to cover a door opening.

13 Claims, 2 Drawing Sheets

PET SHELTER/INCUBATOR

CROSS-REFERENCE TO RELATED APPLICATIONS

This application claims the benefit of U.S. Provisional Patent Application No. 60/390,314 filed Jun. 21, 2002 with the same title.

BACKGROUND OF THE INVENTION

The present invention relates to pet shelter for dogs, cats, and the like, particularly shelters which can be used for newborn pups and kittens.

Conventional pet shelters are generally designed to providing basic shelter. Such shelters are unheated and therefore unsuitable for grown animals in cold enough conditions and are generally unsuitable for very young animals who have not matured enough or are not big enough to generate enough heat to keep themselves sufficiently warm in most conditions.

BRIEF SUMMARY OF THE INVENTION

The present invention is a pet shelter comprising a hollow housing having an interior sufficiently large to comfortably receive at least one dog, and defined at least in part by a floor, a roof opposite the floor and at least one side wall extending between the floor and the roof and only partially surrounding the interior. Also, the housing includes at least one heat generator positioned within the housing to radiate into the interior, and a sensor within the housing that is responsive to the presence and absence of an animal in the interior of the housing, turning the heat generator on in the presence of the animal and off in its absence.

BRIEF DESCRIPTION OF THE SEVERAL VIEWS OF THE DRAWINGS

The foregoing summary, as well as the following detailed description of preferred embodiments of the invention, will be better understood when read in conjunction with the appended drawings. For the purpose of illustrating the invention, there is shown in the drawings embodiments which are presently preferred. It should be understood, however, that the invention is not limited to the precise arrangements and instrumentalities shown.

In the drawings.

DETAILED DESCRIPTION OF THE INVENTION

Figure 1:
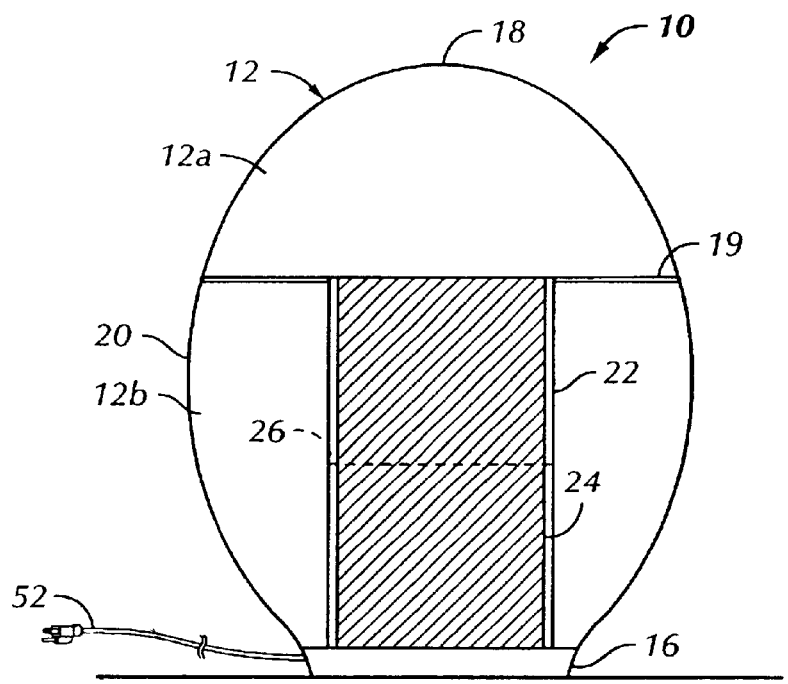
FIG. 1 is a front elevation view facing the side wall opening.
Figure 2:
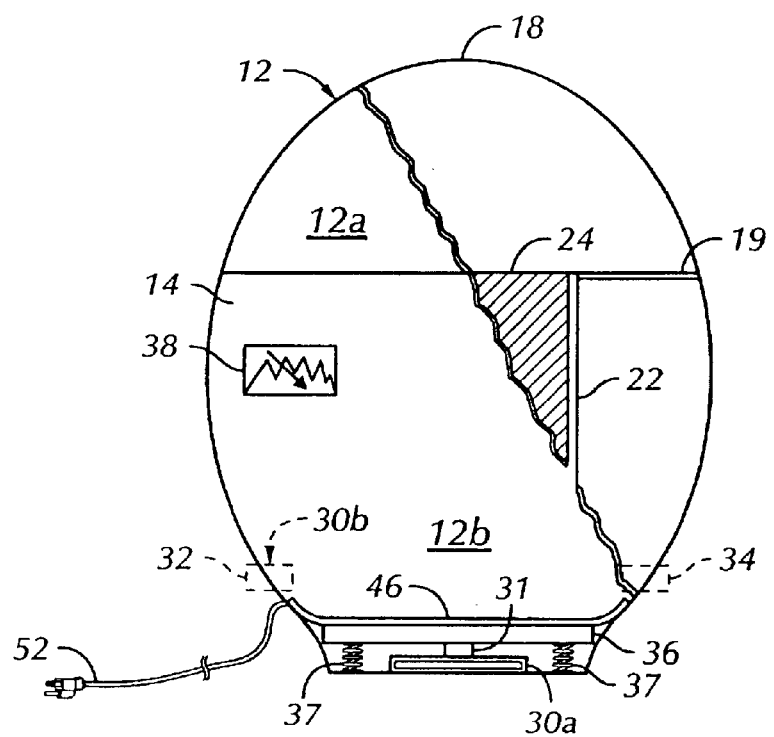
FIG. 2 is a partially broken away front elevation view.
Figure 4:
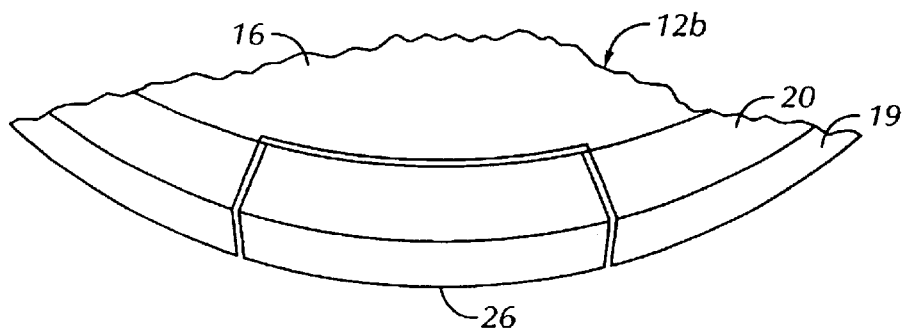
FIG. 4 is an elevation view of a side wall opening and rigid closure.

Referring to the drawings in detail, wherein like numerals indicate like elements throughout, there is shown in FIGS. 1 and 2, a preferred embodiment of the pet shelter/incubator, suitable for use with dogs and pets indoors and outdoors and indicated generally at 10. The shelter 10 is primarily comprised of a hollow housing 12 having an interior 14 sufficiently large to comfortably receive at least one dog, preferably at least a large dog, and further having a generally rigid floor 16, generally rigid roof 18 and at least one generally rigid side wall 20 extending between the floor and the roof. The floor, roof and side wall surround the interior 14. At least one and preferably only one opening 22 is provided on the side of the shelter 10 between the roof 18 and the floor 16. Referring to FIGS. 1 and 2, a movable and/or removable closure 24 can be provided proximal to the opening 22 to keep the opening 22 covered to prevent heat loss. The movable closure 24 may be a swinging door, i.e. a rigid member pivotally hung over the opening as shown in FIGS. 1 and 2, or a curtain (not shown), i.e. a flexible sheet member also hung over the opening configured to permit an animal to push aside the moveable closure 24 and to pass through the opening or an iris (not shown but a resiliently flexible member having a small central opening that expands as the pet steps through it but contracts back to the small opening after the pet has passed through), or other known type of pet door. The moveable closure 24 is preferably also mounted to be fully removable by the owner of the shelter The housing 12 is suggestedly made of a rigid plastic foam, preferably in an egg or ovoid shape with a flat bottom for stability, this preferred shape being illustrated in FIGS. 1 and 2. Preferably, the roof 18 can be made to be easily removed from a remainder of the housing 12. Line 19 marks a junction between a removable roof portion 12a and a remaining portion enclosure portions 12b of the housing 12. The roof portion 12a can be designed to rest on or interfit with the enclosure portion 12b so as to be simply lifted on and off. As is indicated in phantom in FIG. 1, the shelter 10 also preferably includes a separate, rigid removable closure 26 for the opening 22. The rigid closure 26 should cover at least the lower portion of the opening 22 when the moveable closure 24 is detached from the shelter 10 to retain small animals (i.e. puppies or kittens) in the enclosure portion 12b. The rigid closure 26 can be attached to the enclosure portion 12b in the opening 22 in various ways. One way depicted in FIG. 4 is a simple mating beveled shape between the side walls of the removable rigid closure 26 and the housing 12b. The closure 26 is simply wedged into the opening 22. Another suggested way is a tongue and groove system with one structure being applied to the sides of the opening 22 and the other applied to the sides of the rigid closure 26 so it can slide into the opening to cover the opening. Any of a variety of other means and methods including mechanical fasteners can be used. The rigid closure 26 should be sized to prevent a newborn or young kitten or puppy from escaping the shelter 10 through the opening 22.

The shelter 10 contains at least one electric heat generator 38 positioned within the housing 12 to radiate into the interior. The heat generator 38 is preferably a ceramic member with a resistance heating element therein. A ceramic heat generator can be advantageous for the present invention for several reasons. Such a heat generator can have a variable heat control, allowing for adjustments to the temperature of the shelter interior depending upon the generator type and location, pet type, age of the pet, temperature of the environment outside the shelter and other various factors. Additionally, a ceramic heat generator provides a significant degree of safety, because it is able to radiate heat without becoming so hot as to burn to the touch. While the illustration of FIG. 2 shows the heat generator 38 located on the sidewall 20, the heat generator 38 may be located in any portion of the housing 12 including the roof 18 and floor 16. Also, more than one heat generator 38 may be provided, providing more heat, quicker heating, and/or a more even heating of the interior.

Referring specifically to FIG. 2, the present invention also preferably comprises a sensor 30 within the housing that is responsive to the presence and absence of an animal in the interior 14 of the housing 12, and is operably coupled with the electric heat generator(s) 38 to automatically turn on the electric heat generator(s) 38 in the presence of the animal and off in its absence. In one embodiment, shown in FIG. 2, the sensor may be a pressure responsive sensor 30a such as a box containing a simple switch coupled to a relay and located in the floor 16 of the shelter to be activated by the weight of the animal such as by means of a platform 36 on or in or forming all or part of the floor 16 and upwardly biased by one or more springs 37 or other suitable member(s) over a plunger 31 for the mechanical switch or other pair of separated electric contacts. The platform 36 may be a ceramic or other electric heat generator itself In the alternative, shown in phantom in FIG. 2. a sensor 30b may be in the form of a relay coupled through an appropriate circuit (not here depicted) with an infrared transmitter 32 and an infrared receiver 34 positioned to receive light from the infrared transmitter 32. Preferably the infrared emitter 32 is a light emitting diode (LED) and the infrared receiver 34 is an infrared responsive photodiode. The presence of the pet in the shelter would block the infrared receiver 34 from receiving infrared light from the infrared emitter 32 and, in turn, cause the connected relay to switch states and supply power to activate the heat generator 38. The absence of the pet would allow the infrared receiver 34 to receive light from the infrared emitter 32 changing the state of the relay to turn the heat generator 38 off. Having a sensor 30 automatically turn on and off the heat generator 38 allows for the conservation of energy by not heating the shelter 10 when no pet is present.

FIG. 2 also illustrates the shelter 10 preferably comprising a moisture-proof flexible membrane 46 applied to an upper surface of the floor 16. In the case in which there is a heat generator 38 or a pressure sensor 30a or other switch or sensor located in the floor 16, the flexible membrane 46 may be applied to an upper surface of the floor 16 over the sensor and/or heat generator 38 to protect those components from urine or other liquid and to make it easier to clean the interior 14.

Figure 3:
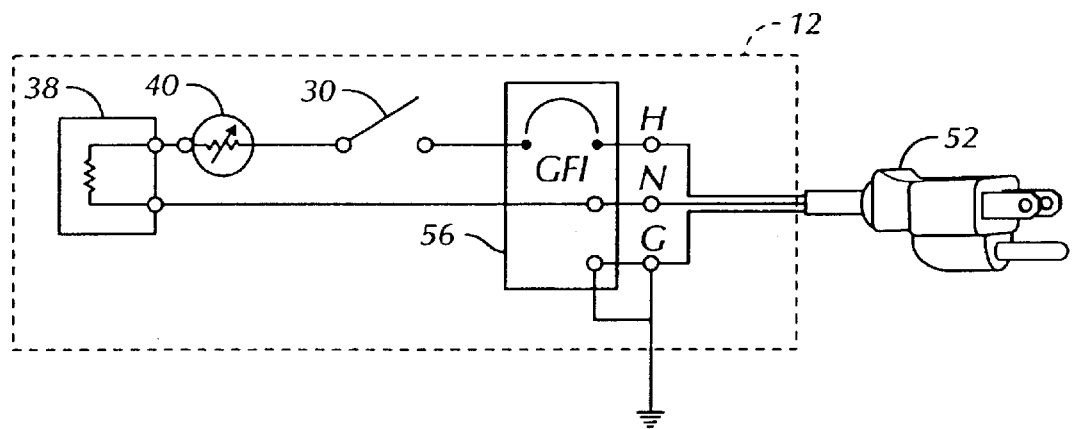
FIG. 3 is a schematic of the ground fault interrupt schematically coupled with the power cords.

Illustrated in FIG. 2, the shelter preferably further comprises an electric power cord 52 extending from the housing 12 and having a first end at least operably coupled with at least the electric heat generator 38 and a second end provided with a conventional male electric wall plug member. The power cord 52 will allow the shelter's electrical devices to draw power from a conventional power outlet making the shelter 10 available for use of a wide range of indoor and outdoor locations. FIG. 3 shows a schematic in which the shelter 10 also includes a ground fault interrupt circuit 56 operably coupled with the electric power cord 52, the sensor 30 and the heat generator 38 with variable heat control 40. The ground fault interrupt (GFI) 56 serves as a safety device by sensing any current flowing directly to ground, as would be the case if a pet was being shocked, and immediately switching off all power to minimize an electrical shock. The GFI 56 can thus be an effective safety device in the shelter 10 by protecting a pet from electric shock. A ground wire (FIG. 3) would be provided for the GFI.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

I claim:

1. A pet shelter comprising:
   a hollow housing having an interior sufficiently large to comfortably receive at least one dog and further having a generally rigid floor, generally rigid roof and at least one generally rigid side wall extending between the floor and the roof and only partially surrounding the interior;
   at least one electric heat generator positioned within the housing to radiate into the interior; and
   a sensor within the housing responsive to the presence and absence of an animal in the interior and operably coupled with the electric heat generator to automatically switch the electric heat generator on and off, respectively.

2. The shelter of claim 1 wherein the hollow housing is a generally ovoid shaped foam material structure having a single side wall opening.

3. The shelter of claim 1 wherein the heat generator is a ceramic member with a resistance heating element therein.

4. The shelter of claim 3 wherein the heat generator is located in the floor.

5. The shelter of claim 3 wherein the heat generator is located in a portion of the housing other than the floor.

6. The shelter of claim 1 wherein the sensor is a pressure responsive sensor located in the floor.

7. The shelter of claim 6 further comprising a moisture proof flexible membrane applied to an upper surface of the floor over the sensor.

8. The shelter of claim 1 further comprising a moisture proof covering applied to an upper surface of the floor.

9. The shelter of claim 1 wherein the sensor includes an infrared emitter and an infrared receiver positioned to receive infrared light from the infrared emitter.

10. The shelter of claim 1 further comprising an electric power cord extending from the housing and having a first end at least operably coupled with at least the electric heat generator and a second end with a conventional male electric plug member.

11. The shelter of claim 10 further comprising a ground fault interrupt circuit operably coupled with the electric power cord between the plug member and the electric heat generator.

12. The shelter of claim 1 wherein the housing has a single front opening and the shelter further comprises a movable closure over the front opening configured to permit an animal to push aside the closure and pass through the opening.

13. The shelter of claim 1 wherein the housing has a single front opening and the shelter further comprises a rigid closure removably secured over at least a lowermost portion of the front opening so as to close the opening to passage therethrough.

* * * * *